United States Patent [19]

Lee

[11] Patent Number: 5,462,974

[45] Date of Patent: * Oct. 31, 1995

[54] EXPANDABLE COMPOSITION AND PROCESS FOR EXTRUDED THERMOPLASTIC FOAMS

[75] Inventor: Shau-Tarng Lee, Oakland, N.J.

[73] Assignee: Sealed Air Corporation, Saddle Brook, N.J.

[ * ] Notice: The portion of the term of this patent subsequent to Sep. 20, 2011 has been disclaimed.

[21] Appl. No.: 309,008

[22] Filed: Sep. 19, 1994

Related U.S. Application Data

[63] Continuation-in-part of Ser. No. 10,275, Jan. 28, 1993, Pat. No. 5,348,984.

[51] Int. Cl.$^6$ .................................................. C08J 9/12
[52] U.S. Cl. ................ 521/79; 264/50; 264/DIG. 5; 521/97; 521/98; 521/142; 521/910
[58] Field of Search ........................ 521/79, 142, 910, 521/97, 98; 264/50, DIG. 5

[56] References Cited

U.S. PATENT DOCUMENTS

| | | |
|---|---|---|
| 2,770,608 | 11/1956 | Barker et al. . |
| 2,770,609 | 11/1956 | Symonds, Jr. . |
| 2,938,879 | 5/1960 | Mock et al. . |
| 3,287,477 | 11/1966 | Vesilind . |
| 3,488,746 | 1/1970 | Gilbert . |
| 3,558,752 | 1/1971 | Sen . |
| 3,644,230 | 2/1972 | Cronin . |
| 3,763,059 | 10/1973 | Needham et al. . |
| 3,787,542 | 1/1974 | Gallagher et al. . |
| 3,939,849 | 2/1976 | Baxter et al. . |
| 3,962,155 | 6/1976 | Usamoto et al. . |
| 3,966,373 | 6/1976 | Johnson . |
| 3,972,970 | 8/1976 | Taylor . |
| 4,070,310 | 1/1978 | Schneider et al. . |
| 4,080,344 | 3/1978 | Ikeda et al. . |
| 4,120,923 | 10/1978 | Kloker et al. . |
| 4,154,785 | 5/1979 | Inui et al. . |
| 4,214,054 | 7/1980 | Watanabe et al. . |
| 4,308,352 | 12/1981 | Knaus . |
| 4,343,913 | 8/1982 | Watanabe et al. . |
| 4,464,484 | 8/1984 | Yoshimura et al. . |
| 4,581,382 | 4/1986 | Liberti et al. . |
| 4,640,933 | 2/1987 | Park . |
| 4,649,001 | 3/1987 | Nakamura et al. . |
| 4,694,026 | 9/1987 | Park . |
| 4,694,027 | 9/1987 | Park . |
| 4,698,191 | 10/1987 | Endo et al. . |
| 4,711,287 | 12/1987 | Kawabara et al. . |
| 4,777,187 | 10/1988 | Weber et al. . |
| 4,810,570 | 3/1989 | Rutten et al. . |
| 4,916,166 | 4/1990 | Suh et al. . |
| 5,000,991 | 3/1991 | Hayashi et al. . |
| 5,026,736 | 6/1991 | Pontiff . |
| 5,034,171 | 7/1991 | Kiczek et al. . |
| 5,035,275 | 7/1991 | Yamaguchi . |
| 5,133,913 | 7/1992 | Miyakawa et al. . |
| 5,348,984 | 9/1994 | Lee .................................. 521/79 |

FOREIGN PATENT DOCUMENTS

| | | |
|---|---|---|
| 52-125839 | 10/1977 | Japan . |
| 52-155401 | 12/1977 | Japan . |
| 52-156201 | 12/1977 | Japan . |
| 53-17698 | 2/1978 | Japan . |
| 53-17699 | 2/1978 | Japan . |
| 53-17700 | 2/1978 | Japan . |
| 53-35709 | 3/1978 | Japan . |
| 53-55545 | 5/1978 | Japan . |

OTHER PUBLICATIONS

Japanese Abstract, JP1254742, Oct. 11, 1989.
Japanese Abstract, JP62153326, Jul. 8, 1987.

*Primary Examiner*—Morton Foelak
*Attorney, Agent, or Firm*—Bell, Seltzer, Park, & Gibson

[57] ABSTRACT

An expandable thermoplastic composition is disclosed for extrusion foaming wherein the composition comprises a polyethylene resin; a blowing agent, which is either ethane or a blend of carbon dioxide and either normal butane, isobutane, propane, ethane, or a mixture of any two or more of these hydrocarbons in admixture with the resin in a ratio of about one part blowing agent to about 10 parts resin; nucleation agent in an amount of from about 0.05 to 0.5 kg per 100 kg of the resin; and glycerol monostearate aging modifier in an amount of from about 0.5 to 5 kg per 100 kg of the resin. A process for extrusion foaming of the composition is also disclosed.

33 Claims, No Drawings

EXPANDABLE COMPOSITION AND PROCESS FOR EXTRUDED THERMOPLASTIC FOAMS

This application is a continuation-in-part of U.S. Ser. No. 08/010,275, which was filed on Jan. 28, 1993 U.S. Pat. No. 5,348,948 and is entitled "Expandable Composition and Process for Extruded Thermoplastic Foams."

FIELD OF THE INVENTION

This invention relates to an expandable composition for producing low density thermoplastic foams and a process for producing an expanded thermoplastic foam product of low density using an expandable thermoplastic composition. In particular, this invention relates to the use of blowing agents for incorporating into a plasticized thermoplastic resin for foaming by extrusion.

BACKGROUND OF THE INVENTION

Thermoplastic foam products can be produced by a wide variety of processes, of which extrusion is but one, that are in part responsible for the wide variety of foam products available today. Foams range in consistency from rigid materials suitable for structural use to flexible substances for soft cushions and packaging materials. These foams range in cellular formation from open or interconnecting-cell foams to closed or unicell foams. The cell structure may range from large to fine. Electrical, thermal, mechanical, and chemical properties can be varied within wide limits depending on the thermoplastic resin composition and the method chosen to create the foam. Foamed thermoplastics range in density anywhere from about 10 kg/m$^3$ to over 1,000 kg/m$^3$, although the latter perhaps more properly are called microcellular structures. True foams are considered to have a density of less than about 800 kg/m$^3$.

Many methods have been developed for the manufacture of foamed thermoplastics, which generally can be classified into three groups: 1) methods for adding a gaseous "blowing agent" to the thermoplastic during processing, 2) methods for producing a gaseous blowing agent in the thermoplastic during processing, and 3) methods for forming a thermoplastic mass from granules to obtain a cellular structure. Similar blowing agents sometimes are used in the various methods to produce foams. However, the effectiveness of a particular blowing agent varies considerably depending on the thermoplastic resin composition, the method chosen, the process conditions, the additives used, and the product sought.

Blowing agents work by expanding a thermoplastic resin to produce a cellular thermoplastic structure having far less density than the resin from which the foam is made. Bubbles of gas form around "nucleation sites" and are expanded by heat or reduced pressure or by a process of chemical reaction in which a gas is evolved. A nucleation site is a small particle or conglomerate of small particles that promotes the formation of a gas bubble in the resin. Additives may be incorporated into the resin to promote nucleation for a particular blowing agent and, consequently, a more uniform pore distribution. However, the foam is maintained by replacing the blowing agent in the cells with air. Diffusivity of the blowing agent out of the cells relative to air coming into the cells impacts the stability of the foam over time and whether the cells of the foam may collapse. Additives may be incorporated into the resin and process conditions may be adjusted to assist in controlling the diffusivity of the blowing agent, to promote foam stability, and to limit collapse of the foam to acceptable limits.

Methods for producing a blowing agent in situ usually involve a chemical reaction that evolves gas. Polyethylene, silicone, epoxy, and vinyl foams have all been produced by adding a substance that will produce a gaseous blowing agent chemically. For example, dinitroso compounds and hydrazides, which evolve nitrogen gas on decomposition, and bicarbonates, which evolve carbon dioxide, have been added to thermoplastic resins to produce foams.

Polystyrene foams often are produced by "bead molding," in which partially expanded granules or beads are heated in a mold in the presence of a blowing agent to expand and fuse the particles into a rigid unicellular structure. A volatile organic compound or some other gaseous blowing agent is impregnated into the beads. Heat is applied and the pressure is released to cause the beads to expand and fuse.

There are several methods for adding a blowing agent to a thermoplastic resin during processing to produce a foam. Ureaformaldehyde and polyvinylformaldehyde foams have been produced by whipping air into a heated thermoplastic mass before it sets. Polyolefinic foams have been produced by introducing air or some other gas or volatile solvent into a heated thermoplastic polyolefin mass and then heating the mass or reducing pressure to expand the gas and form pores of a desirable size. One more specific method is to impregnate a thermoplastic resin with blowing agent under heat and pressure in a closed vessel. The pressure is released to expand the blowing agent to form "prefoamed," or partially expanded, beads. Prefoamed beads usually are further expanded in an enclosed vessel such as a mold to produce a molded foam product, as is discussed above.

Another more specific method, to which the invention claimed herein relates, is to mix the blowing agent with molten resin under pressure and then extrude the mixture through a forming die into a zone of reduced pressure. Shaped extruded foams can be produced by this method using a forming die of particular configuration. Plank, which can be cut to a desirable shape, and thin foam sheets are produced in this manner.

Many of the halogenated hydrocarbons have been used for several years as blowing agents in various methods for producing foams from thermoplastic resins. The halogenated hydrocarbons include the chlorofluorocarbons ("CFCs") and hydrochlorofluorocarbons ("HCFCs"). CFCs and HCFCs are readily impregnable in thermoplastic resins and are readily expandable under relatively mild conditions. CFCs and HCFCs generally produce foams of high quality with a minimum of processing difficulty. The pore size is controllable, the foam has good stability with minimum tendency to collapse after a period of time, and the surface characteristics of the foam are smooth and desirable. Also, CFCs, HCFCs, and other halogenated hydrocarbons typically are either not flammable or are of low flammability, which greatly reduces the care with which they may be used. These compounds have the further advantage of low toxicity. However, governmental regulation is phasing out use of halogenated hydrocarbons because the halogenated hydrocarbons may be responsible for damage to the earth's ozone layer.

Producers of thermoplastic foam products have been seeking alternatives to CFC and HCFC blowing agents for a number of years to reduce or eliminate altogether the amount of halogenated hydrocarbons used. A number of volatile organic compounds (VOCs) have been proposed, although many of these also are somewhat objectionable.

VOCs include the light aliphatic hydrocarbons such as ethane, propane, n-butane, isobutane, butylene, isobutene, pentane, neopentane, and hexane, to name but a few. The diffusivity of VOCs can be many times faster than that of the halogenated hydrocarbons and harder to control. Foam collapse and stability problems have been encountered, although high quality foams have been produced using, for example, butane.

VOCs typically are volatile and flammable, thus presenting handling problems and safety concerns. Butane blowing agents normally are used for foam extrusion of polyolefins in an amount from about 15% to 16% by weight of the resin, typically in combination with active nucleating agents in amounts of about 5% by weight of the resin. Butane is extremely flammable and at the levels used for blowing agent an aging period typically is provided to reduce residual butane blowing agents below explosive limits prior to shipment of the foam. Ethane is less flammable than butane but is extremely volatile and typically has not been suitable for producing extruded polyolefin foams, especially extruded foam thin sheets or plank from low density polyethylene. The extruded foams normally are not stable and tend to collapse. At typical concentrations of blowing agent in polyolefin resin, prefoaming can occur in the extruder and the foam sometimes is corrugated.

Inert gases have also been proposed as blowing agents, although these sometimes do not provide acceptable results, especially for producing extruded foams. Inert gases include nitrogen, argon, xenon, krypton, helium, and carbon dioxide. Nitrogen and carbon dioxide, in particular, have the advantage of being inexpensive, readily available, and of not being flammable, and are not considered to be harmful to the earth's ozone layer. However, inert gases usually are not as readily soluble in thermoplastic resins as CFCs, HCFCs, and VOCs, are of higher volatility, and do not reduce the viscosity of the resin. Lubricants often are added to the resin for extrusion foaming. The range of processing conditions for producing acceptable products is narrower than for CFCs, HCFCs, and VOCs. Mixing the resin with an inert blowing agent and keeping the inert blowing agent in the resin is more complicated than for CFCs, HCFCs, and VOCs. The surface texture of extruded foams sometimes is rough. Extruded low density foams and thick foams are difficult to achieve. The foam sometimes has poor stability and foam shrinkage sometimes is uncontrollable.

As examples of the use of various blowing agents for molding and prefoamed bead production, Kloker et al. U.S. Pat. No. 4,120,923 and Yoshimura et al. U.S. Pat. No. 4,464,484 disclose the use of the inert gas carbon dioxide as a blowing agent for molded polyolefin foam articles and for polymer beads, respectively. Yoshimura et al. U.S. Pat. No. 4,464,484 disclose that a mixture of carbon dioxide and aliphatic hydrocarbons and halogenated aliphatic hydrocarbons, including CFCs and HCFCs, are useful blowing agents for polyolefin beads. Broad ranges of blends of VOCs, CFCs, and HCFCs with carbon dioxide are disclosed and mixtures of butane or dichlorodifluoromethane and carbon dioxide are exemplified.

However, no suggestion is made that any of these blowing agents for prefoamed beads would be useful for producing extruded thermoplastic foams. Extrusion and prefoamed bead production are different processes that produce entirely different products and are not processes that can be substituted one for the other. A blowing agent may produce a foam product having desirable characteristics in one process, but not in the other.

Extrusion foaming and prefoamed bead production differ in at least the following respect. Extrusion foaming is a continuous process in which a plasticized thermoplastic resin is cooled and expanded when the resin and blowing agent are extruded into a zone of lower pressure. On the other hand, the process for producing prefoamed beads is a batch process in which a solid resin is impregnated with a blowing agent, typically at a relatively lower temperature than extrusion foaming, and heated to expand the blowing agent.

The conditions at which extrusion foaming and prefoamed bead production occur further illustrate the differences in these processes. In prefoamed bead production, the resin usually is solid and so impregnation with blowing agent can take up to an hour or more. On the other hand, mixing of blowing agent with polyethylene resin for extrusion foaming can take place in as little as a few minutes or less because the resin is plasticized. Nucleating and stability control agents typically are used in extrusion foaming, even for CFC and HCFC blowing agents, to control cell formation, diffusivity of the blowing agent, and stability of the foam. Nucleating and stability control agents typically are not used in prefoamed bead production. Also, a medium such as water or glycol typically is used as a dispersion medium for the polymer particles in prefoamed bead production. No such medium is needed or used for extrusion foaming.

As an example of extrusion foaming, Watanabe et al. U.S. Pat. No. 4,214,054 disclose numerous volatile organic blowing agents including various CFCs, VOCs, and the use of decomposable gas-releasing chemical blowing agents for producing extruded polyolefin foams from particular resin compositions.

Nakamura et al. U.S. Pat. No. 4,649,001 propose preparing long, thin sheets of low density polyethylene foams by extruding a resin mixture of low density polyethylene and linear low density polyethylene. The extruded foam sheet is drawn at a rate faster than the extrusion rate to produce long, thin sheets. Foaming agents are said to include inorganic gases such as carbon dioxide and a number of VOCs and HCFCs. No specific blends of blowing agents are suggested. Nakamura et al. is directed to the problem of producing long, thin sheets from a thermoplastic resin that has produced foams of small elongation and inferior tensile strength, but does not recognize the problems associated with using either carbon dioxide or butane alone as a blowing agent.

Johnson U.S. Pat. No. 3,966,373 proposes a method and apparatus for making relatively dense structural foam profiles having a foam core and a dense skin. A partially expanded extruded thermoplastic polymer composition is conveyed through a chilled shaping passage moving at the same rate as the foam to eliminate friction. The dense skin is formed by the chilled passage while the polymer resin is still expanding. Foaming agents are said to include nitrogen, carbon dioxide, lower molecular weight paraffins such as propane, butane, and methylchloride, lower molecular weight olefins such as ethylene, propylene, and butylene or mixtures of the above. No specific mixtures of foaming agents are disclosed. A preferred thermoplastic composition for extrusion to form tongue depressors or ice cream sticks of 320 to 1000 kilograms per cubic meter is disclosed to include polystyrene beads having a pentane blowing agent integrated therewith.

Gilbert U.S. Pat. No. 3,488,746 discloses a process for preparing a foamed polyethylene layflat tube by blow extruding a foamable polyethylene resin composition through an annular die. Blowing agents are said to include lower aliphatic hydrocarbons such as ethane, propane, butane, or pentane, lower alkyl halides such as methylchloride, trichloromethane, or 1,2-dichlorotetrafluorethane and inorganic gases such as carbon dioxide or nitrogen. Butane and isobutylene are said to be preferred. Highly active nucleating agents such as silica or alumina or small quantities of decomposable nucleating agents are disclosed in quantities of up to about 5 percent by weight of the resin.

Vesilyn U.S. Pat. No. 3,287,477 discloses extrusion apparatus and methods for preparing polymer foams and is primarily directed to polystyrene foam. Vesilyn discloses that the extrusion apparatus can also be operated with other polymers including polymers derived from ethylene monomers to produce foam sheets. Blowing agents are said to include examples such as methane, ethane, propane, butane, n-pentane, isopentane, neopentane, hexanes, heptanes, and a variety of others.

Kiczek et al. U.S. Pat. No. 5,034,171 propose a process for producing extruded thermoplastic foams wherein inert gases including nitrogen, carbon dioxide, and others are used as the sole blowing agent, without blending with CFCs, HCFCs, or VOCs. Inert gases such as nitrogen, carbon dioxide, and others would be particularly preferred blowing agents for extruded polyolefin foams because these gases typically are relatively inexpensive and are not considered harmful to the ozone layer. However, inert gas blowing agents generally have not proved suitable for producing extruded polyolefin foams, as discussed hereinabove.

SUMMARY OF THE INVENTION

The invention claimed herein relates to the use of a blowing agent for extrusion foaming of relatively low density polyolefin foams wherein the blowing agent is selected from either ethane or a blend of carbon dioxide and a hydrocarbon selected from among normal butane, isobutane, propane, ethane, or a mixture of any two or more of these hydrocarbons. This blowing agent substantially reduces the problems associated with inert gas blowing agents, VOCs in general, CFCs, and HCFCs. It has been discovered that a thermoplastic composition containing this blowing agent can produce extruded polyolefin foams having the requisite pore structure, density, and dimensional stability. Extruded foams produced with this blowing agent have a density after seven days from extrusion of from at least about 20 kilograms per cubic meter to at least about 40 kilograms per cubic meter, which is an acceptable and stable foam density. Higher foam densities of up to about 100 kilograms per cubic meter can be produced, if desired. The amount and type of hydrocarbon in the blowing agent, the composition of the resin, and/or the processing conditions can be controlled so that residual blowing agent associated with fresh foam remains below explosive limits.

In more specific embodiments, the blowing agent for extrusion foaming of polyolefin foam products is a blend of carbon dioxide and normal butane, isobutane, propane, ethane, or mixtures thereof in which the hydrocarbon is present in an amount sufficient to produce a stable foam without substantially increasing the flammability of the blowing agent as compared to the butanes when used as the sole blowing agent. The amount of hydrocarbon in the blend should be sufficiently low so that substantial aging is not required after the foam is produced. Residual blowing agent should be below explosive limits in typical processing operations.

In the case of ethane it has been determined that no carbon dioxide need be present and that acceptable foams can be produced with a suitable resin and under appropriate conditions with either pure ethane, or very high percentages of carbon dioxide in a carbon dioxide and ethane blend, or various blends of ethane and $CO_2$ in between. The carbon dioxide can be present in a ratio of from about 0:1 to 5:1 or even 20:1 by weight in the case of ethane, which is from 0 to about 95 percent by weight of carbon dioxide.

In the case of propane, isobutane, and normal butane, carbon dioxide is useful in the blend in a ratio of carbon dioxide to propane, normal butane, isobutane, or mixtures thereof of from about 1:4 to 4:1. In a mixture of propane, isobutane, or normal butane with ethane and carbon dioxide, less carbon dioxide could be used, depending on the amount of ethane, if desired.

The expandable composition for producing extruded polyolefin foam products having dimensional stability is a plasticized polyolefin resin mixed with blowing agent as described above. Preferably, the expandable composition will also contain an aging or permeation modifier and a nucleation agent for controlling the size of the cells of the foam. Low activity nucleating agents are useful when using a blowing agent containing ethane. Low activity nucleating agents are useful when $CO_2$ is incorporated into a blend with isobutane, normal butane, propane or ethane, or a mixture of any two or more of these.

In a still more specific embodiment, the expandable composition includes a polyethylene resin, about 0.5 to 5 kilograms of glycerol monostearate per 100 kilograms of the resin, about 0.05 to 0.5 kilograms of zinc oxide, talc, or other relatively low activity nucleating agent per 100 kilograms of the resin, and from about 1 to 20 kilograms of blowing agent per 100 kilograms of the resin, which blowing agent has about equal amounts by weight of carbon dioxide and either normal butane, isobutane, propane, ethane or mixtures thereof.

The invention also relates to a process for producing an expanded polyolefin foam wherein a plasticized polyolefin resin is mixed with the blowing agent and then extruded through an extruder to produce the foamed polyolefin product.

DETAILED DESCRIPTION

Various processes and equipment for extrusion foaming of thermoplastic resins have been used for many years. Generally, solid pellets of thermoplastic resin are fed through a hopper to a melting zone in which the resin is melted, or plasticized, to form a flowable thermoplastic mass. The plasticized thermoplastic mass generally is then metered to a mixing zone where the thermoplastic mass is thoroughly mixed with a blowing agent under pressure for subsequent cooling and expansion of the resin to form a foam. Blowing agent typically is injected between the metering and the mixing zones. The mixture of thermoplastic resin and blowing agent is then forced through a die, which imparts a shape to the thermoplastic mass, into a zone of lower pressure, such as atmospheric pressure. The blowing agent expands to form the cells of the foam and the thermoplastic foam is cooled.

Typical of much of the equipment used for extrusion of thermoplastic foams, the thermoplastic pellets are conveyed from a hopper through the melt zone, the mixing and cooling zones, and extruded through the die by a screw type apparatus. Single screw extruders are common, although double screw extruders sometimes are used for greater mixing and tandem extruders can be used to provide greater cooling of the resin prior to foaming.

When a blowing agent is injected into the mixing zone of the screw extruder, the blowing agent initially forms a dispersion of insoluble bubbles within the plasticized thermoplastic mass. These bubbles eventually dissolve in the thermoplastic mass as the mixing continues and the pressure increases down the length of the extruder. The extruder should have a length to diameter ratio of at least 30:1 and a sufficient length of mixing zone to ensure that proper mixing occurs.

Thermoplastic resins contemplated for use in the practice of the invention include the polyolefin resins, although not necessarily with equivalent results. Polyolefin resins may be defined as polymers derived from unsaturated hydrocarbons containing the ethylene or diene functional groups. Polyolefin resins may include virtually all of the addition polymers, however, the term polyolefin typically is used for polymers of ethylene, the alkyl derivatives of ethylene (the alpha-olefins), and the dienes. Among the more commercially important polyolefins are polyethylene, polypropylene, polybutene, and their copolymers.

Polyethylene is a whitish, translucent polymer of moderate strength and high toughness. Polyethylene is available in forms ranging in crystallinity from 50 to 95 percent. Polyethylene is available in low, medium, and high density polymer forms. For the low density material, the softening temperature is about 105° C. to 115° C. For the high density material the softening temperature is some 25° C. to 40° C. higher, or from about 130° C. to 140° C. Low, medium, and high density polyethylenes typically are suitable for extrusion foaming, including mixtures thereof, although not necessarily with equivalent results. Low density polyethylene resins, which have high melt strength, are particularly useful in the practice of the invention claimed herein, especially where ethane is the blowing agent or the predominant component of the blowing agent.

The invention is useful for producing thin foam sheets of less than or equal to about ¼-inch thickness. Thin foam sheets of less than or equal to about ½-inch thickness and thick plank of greater than ½-inch thickness are also contemplated in the practice of the invention.

The thermoplastic resin should be maintained at a temperature within a range above the melting point of the polymer that is sufficiently high so that the polymer has sufficient fluidity for mixing with blowing agent. This range normally will be from about 20° C. to 100° C. above the melting point of the resin. The melting zone can be maintained at a somewhat lower temperature due to the heat that is generated by friction as the plasticized resin flows through the extruder.

After mixing, the temperature of the mixture of resin and blowing agent should be lowered closer to the melting point of the mixture so that the polymer maintains its structure upon foaming, but not so much that complete expansion is hindered. The blowing agent has a plasticizing effect on the resin reducing its viscosity, or resistance to flow, and so the melting point of the mixture of resin and blowing agent normally is below that of the resin alone. The expansion temperature, which is above the melting point of the mixture, is empirically determined and depends upon the composition of the resin, the length of the screw, whether single or double screws are used, on the specific resin, upon the amount of blowing agent, and the specific blowing agent blend. For a low density polyethylene, the expansion temperature will generally be in the range of from about 85° C. to 120° C.

The blowing agent contemplated for use in practicing the invention claimed herein comprises either ethane or a mixture of carbon dioxide and either normal butane, isobutane, propane, ethane, or mixtures of any two or more of these hydrocarbons. Unlike butane foams of the prior art, foam produced by the process of the invention with either pure ethane or with mixtures of carbon dioxide and either normal butane, isobutane, propane, ethane, or mixtures of any two or more of these hydrocarbons typically can be shipped immediately because the residual levels of blowing agent are below explosive limits as the foam is produced, as explained below.

Table 1 below shows the upper and lower flammability limits in air for normal butane, isobutane, propane, and ethane based on the percent by volume of the hydrocarbon in air. The lower explosive limit for ethane is 3 percent by volume in air compared to 1.8 percent for the butanes. Combined with the lower level of usage that is possible for ethane blowing agent, 100 percent ethane presents a concentration in fresh foam that typically is below explosive limits, whereas butane is often above.

TABLE 1

| Flammability Limits Vol. % In Air | | |
|---|---|---|
| | Lower | Higher |
| Butane (n or iso) | 1.8 | 8.4 |
| Propane | 2.1 | 9.5 |
| Ethane | 3.0 | 12.5 |

Butane, propane, and ethane have a progressively greater high foaming efficiency. For a given weight, ethane generates more gas volume than propane, which generates more gas volume than the butanes. Less ethane typically is required than is required of the butanes to achieve a comparable foaming efficiency, whether used alone or blended with carbon dioxide. Only about 5 percent by weight of the resin of ethane is used as a blowing agent when pure ethane is used, compared to about 16 percent for pure butane. Therefore, the plasticizing effect of ethane as a blowing agent is much less than in the case of others such as a butane. The temperature of the resin in the extruder and die tends to increase and nucleation is difficult to control with the typical active nucleators. Ethane blowing agent used in the same amounts and with the same nucleators as butane produces small bubbles and a high density foam that is subject to collapse. Prefoaming in the extruder and corrugation of the foam can occur.

In the practice of the invention, process conditions and nucleation are carefully controlled to produce low density foams from an ethane blowing agent that are dimensionally stable. A minimum die opening can be used to maintain sufficient pressure to prevent prefoaming. However, the minimum die opening increases the shear and heat and sensitivity of the system to nucleation.

Very low levels of relatively inactive metal oxide nucleators, from 0 to 0.4 percent by weight of the resin, such as zinc oxide and zirconium oxide, have been used in combination with ethane blowing agent in accordance with the invention for foam extrusion of polyethylene foam. Also, while the foam can be made with a single screw extruder, it is helpful in the process of the invention to use tandem extruders where the first extruder is used for mixing and the second extruder is used to maximize cooling of the resin prior to foaming.

While no carbon dioxide need be present when ethane is used as a blowing agent in accordance with the present invention, acceptable foams can be produced with very high percentages of carbon dioxide in admixture with ethane. The carbon dioxide can be present in a ratio of from about 0:1 to 5:1, 10:1, or even 20:1 by weight in the case of ethane, which is from 0 to about 95 percent by weight of carbon dioxide.

When propane, isobutane, and normal butane are used, then carbon dioxide should be used in the blend in a ratio of carbon dioxide to propane, butane, isobutane, or mixtures thereof of from about 1:4 to 4:1. Somewhat higher concentrations of propane should be possible in the blend, up to about 85 percent propane and 15 percent carbon dioxide, so long as the flammability of the blowing agent is not increased so that it approaches the level of pure butane, which is extremely flammable and can be present in explosive limits when the foam product is shipped. Ethane incorporated into the blend increases the amount of carbon dioxide useful in the blend and can also reduce the amount of carbon dioxide needed to reduce the flammability of the residual blowing agent below explosive limits under typical processing conditions.

At about 20 percent carbon dioxide or more, up to about 80 percent carbon dioxide, then acceptable foams can be made with virtually any mixture of carbon dioxide and propane, normal butane, isobutane, ethane, or mixtures thereof. A mixture of about 50 percent carbon dioxide by weight and 50 percent of either normal butane, isobutane, propane, ethane or mixtures thereof has proved useful.

The blowing agent is mixed into the plasticized polyethylene polymer resin in proportions to achieve the desired degree of expansion in the resulting foamed cellular product. Stable foam densities from 40 kg/m$^3$ down to as low as 20 kg/m$^3$ may be made by practice of the invention. Stable foams of higher density, up to about 100 to 120 kg/m$^3$, can also be produced, if desired.

The blowing agent generally is mixed with the resin in a ratio of about one part blowing agent to ten parts resin, except in the case of pure ethane, in which case the blowing agent typically will not exceed about 4 to 7 percent, or even 5 to 6 percent of the resin. The maximum useful proportion of blowing agent in the plasticized resin is affected by the pressure that is maintained on the resin in the extrusion die passage, as is believed to be well known to the skilled artisan.

The benefits of using the blowing agent blend of the invention claimed herein may be enhanced by using a combination of a nucleation agent and an aging modifier to control cell size and development and to control the replacement of blowing agent with air in the cells of the foam, respectively. In particular, it has been found that a combination of low levels of relatively low activity metal oxide nucleation agents, such as zinc oxide, zirconium oxide, talc, and others, in combination with an aging modifier such as glycerol monostearate, is useful to further reduce the density of the foams produced and results in a thickness increase.

The aging modifier is mixed with the polyethylene resin prior to melting in an amount sufficient to produce a desirable rate of exchange of air with blowing agent in the cells of the foam. More specifically, glycerol monostearate is mixed with the polyethylene resin prior to melting in an amount from about 0.5 to 5 kg per 100 kg of polyolefin resin. Still more specifically, glycerol monostearate is added in an amount of 1 kg per 100 kg of polyolefin resin.

Nucleation agent is mixed with the resin in an amount sufficient to promote nucleation and to develop a pore structure of the desired size. More specifically, nucleation agent is mixed with the resin in an amount of from about 0.05 to 0.5 kg per 100 kg of polyolefin resin. Generally, low activity metal oxide nucleators have proved useful for ethane blown foams and all of the blends described herein. As the percentage of $CO_2$ increases, it is helpful to use a low activity nucleator.

The following Table 2 compares the results achieved using various examples of the blowing agent of the present invention (Runs 1 and 2), in which carbon dioxide is present in the blowing agent in an amount of about 50 percent by weight, to examples of 100 percent isobutane blowing agent (Run 3), 100 percent carbon dioxide blowing agent (Run 4), and a mixture of carbon dioxide and hydrofluorocarbon 152-a in about equal amounts by weight (Run 5). In all cases, the resin is a low density polyethylene.

TABLE 2

| Run | Blowing Agent | B.A. Level kg/hr | Die Melt Temp. °C. | Foam Den. kg/m$^3$ | | |
|---|---|---|---|---|---|---|
| | | | | 0 | 1 Day | 7 Days |
| 1 | $CO_2$/Isobutane | 10.0 | 106 | 34 | 27 | 28 |
| 2 | $CO_2$/N-butane | 10.0 | 100 | 40 | 34 | 34 |
| 3 | Isobutane | 16.5 | 85 | 19 | 17 | 18 |
| 4 | $CO_2$ | 1.4 | 94 | 66 | 90 | 80 |
| 5 | $CO_2$/HFC-152a | 2.1 | 85 | 43 | 44 | 42 |

As shown in Table 2, the blowing agent blend of the invention claimed herein produced a superior foam having a desirable foam density that remains stable for seven days after extrusion. The pure carbon dioxide blowing agent produced a foam having a higher density.

A single screw extruder was used for Runs 1 through 3 having a length to diameter ratio of 48:1. The melting zone was maintained at 77° Centigrade and the resin flow rate was maintained at 100 kg/hr. The resin had a melt index of 1 and a density of 922 kg per cubic meter. A glycerol monostearate aging control additive was mixed with the resin at a rate of 1 kg/hr. A zinc oxide nucleation control agent was mixed with the resin at the rate of 0.1 kg/hr.

Runs 4 and 5, which use 100 percent carbon dioxide blowing agent and a mixture of carbon dioxide and hydrofluorocarbon 152-a, respectively, were conducted using a counter-rotating twin screw extruder to provide greater mixing and were conducted at a slower resin flow rate with relatively higher amounts of nucleating agent and aging control additive. The resin flow rate was 39 kg/hr. The expandable composition included additives of 1 kg/hr fluoropolymers (PPA-225, 3M), 0.065 kg/hr zinc oxide nucleating agent, and 0.38 kg/hr glycerol monostearate aging control additive. These modifications were made due to the relative insolubility of the carbon dioxide and the carbon dioxide and fluorocarbon blowing agent mixture in the polyethylene resin. The fluoropolymers were added to provide a lubricating effect at the extrusion die.

The following Table 3 compares the results achieved using examples of the blowing agent in accordance with the present invention (Runs 6 and 7), in which carbon dioxide is present in the blend in an amount of about 50 percent by weight, to examples of a mixture of 50 percent carbon dioxide and hydrofluorocarbon 22 (Run 8) and 100 percent carbon dioxide blowing agent (Run 9). In all cases the resin is a low density polyethylene.

TABLE 3

| Run | Blowing Agent | B.A. Level kg/hr | Foam Den. kg/m³ 0 | 1 Day | 7 Days | Surface |
|---|---|---|---|---|---|---|
| 6 | $CO_2$/Isobutane | 3.0 | 74 | 64 | 67 | Good |
| 7 | $CO_2$/N-butane | 3.0 | 96 | 85 | 85 | Good |
| 8 | $CO_2$/HCFC-22 | 4.5 | 32 | 26 | 26 | — |
| 9 | $CO_2$ | 1.7 | 98 | 110 | 108 | Surface Strings |

As shown in Table 3, the blowing agent of the invention claimed herein of Runs 6 and 7 produced a superior foam having a desirable foam density that remains stable for seven days after extrusion. The surface characteristics of these foams, as determined by visual inspection, were all good. The pure carbon dioxide blowing agent produced a foam having higher density with surface strings, which is a surface characteristic not normally desired in expanded foam products.

A counter-rotating twin screw extruder was used for Runs 6 through 9. The melting zone was maintained at about 140 to 160 degrees Centigrade and the resin flow rate was maintained at 39 kg/hr. The resin had a melt index of 2 and a density of 922 kg per cubic meter. A glycerol monostearate aging control additive was mixed with the resin at a rate of 1 kg/hr. Talc nucleation control agent was mixed with the resin at the rate of 0.1 kg/hr.

The following Table 4 shows examples comparing the results achieved using 100 percent ethane blowing agent (Runs 11 through 14) to the results achieved using 100 percent butane blowing agent (Run 10). In all cases the resin is a low density polyethylene having a melt index of 2 and a density of 922 kg/m³.

butane. Cell size in these foams varied from fine to medium to coarse depending on the level and type of nucleating agent present in the resin. The surface characteristics of these foams were all good.

The favorable results seen in Table 4 were all achieved at blowing agent levels of 100 percent ethane of from 5.0 to 6.3 percent, which, compared to butane blowing agent as seen in Run 10, is a lower usage level by about two thirds. A foam prepared with butane blowing agent, as seen in Run 10, was prepared with butane blowing agent at the rate of about 16 percent. The foam produced with butane exhibited a larger thickness variation than the foam produced with ethane.

A counter-rotating twin screw extruder was used for Runs 10 through 13. The melting zone was maintained at about 140 to 160 degrees Centigrade. Tandem single screw extruders were used for Run 14 at a melting zone temperature of about 120 degrees Centigrade. Typically, tandem extruders are operated with the melting zone at about 75 to 120 degrees Centigrade. For Runs 10 and 11, the resin had a flow rate of 136 kg/hr in an extruder having a screw diameter of 9 cm. For Runs 12 and 13, the resin had a flow rate of 40 kg/hr in an extruder having a screw diameter of 6.8 cm. For Run 14, the resin had a flow rate of 160 kg/hr. Melting and mixing occurred in the primary single screw extruder. Screw diameter was 11.4 cm. Cooling took place in the secondary extruder. Screw diameter was 15.2 cm.

In each of Runs 10 through 14, a glycerol monostearate aging control additive was mixed with the resin at a rate of about 1 kg/hr. Various nucleators, talc, zinc oxide, and Baylith W, which is a commercially available sodium salt of silicic acid, were mixed with the resin for Runs 10 and 12 through 14 as shown in Table 4 at levels of from 0.1 to 0.4 kg/hr.

The following Table 5 shows examples of foams prepared with ethane and propane blowing agents as described above,

TABLE 4

TEST RSULTS

| Run | Blowing Agent | B.A. Level, pph(kg/hr) | Nucleator Level, pph | Density Kg/m³ | Thickness Variation, cm 0 | 1 day | 7 days | Foam Cell Size |
|---|---|---|---|---|---|---|---|---|
| 10 | Butane | 16(21.6) | Talc/0.4 | 21 | 0.23 | 0.31 | 0.30 | medium |
| 11 | Ethane | 5.5(7.5) | — | 29.6 | 0.18 | 0.18 | 0.178 | fine |
| 12 | Ethane | 5.0(2.0) | $Z_nO$/0.2 | 32 | 0.33 | — | 0.34 | coarse |
| 13 | Ethane | 5.0(2.0) | Baylith W-/0.4 | 36.8 | 0.10 | — | 0.19 | fine |
| 14 | Ethane | 6.3(10.5) | Talc/0.1 | 22.4 | 0.5 | 0.54 | 0.54 | medium |

As shown in Table 4, 100 percent ethane blowing agent produced a superior foam having a desirable foam density of from 22.4 to 36.8 kg/m³ that remains stable for seven days after extrusion with minimum variation in foam thickness. The favorable lack of thickness variation produced benefits in foam roll production as compared to foams produced with except for the absence of glycerol monostearate. As shown, the density of the foams is somewhat higher than is typically desirable and the density varied over the aging period more than is desirable.

TABLE 5

| Blowing Agent | B.A. Level pph | Nucleator pph | Density Kg/m³ | Thickness, cm 0 | 1 Day | 7 Days | Cell |
|---|---|---|---|---|---|---|---|
| Ethane | 4.5 | Talc/0.06 | 52 | .22 | .18 | .22 | medium |
| Propane | 9.5 | Talc/0.23 | 52 | .25 | .15 | .20 | medium |

The following Table 6 shows an example of an expanded foam product made with a blowing agent in accordance with the present invention and upon a fresh sample of which a flame test was conducted. The blowing agent comprised carbon dioxide in an amount of about 27 percent by weight of the blowing agent, normal butane in an amount of about 15 percent by weight, and isobutane in an amount of about 58 percent by weight. The sample did not pick up flame from a Bunsen laboratory burner while contacted with flame at the center of the sample. A small hole developed due to melting. In contrast, a sample produced with a pure butane blowing agent caught flame and burned through until the sample material was exhausted.

TABLE 6

| 20/80 N/ Iso-Butane, kg/hr. | $CO_2$, kg/hr. | Thickness, mm | | Density, kg/m³ | |
| --- | --- | --- | --- | --- | --- |
| | | 0 | 7 days | 0 | 7 days |
| 12.8 | 4.8 | 1.3 | 1.4 | 28 | 29 |

The resin from which the foam of Table 6 was made was a low density polyethylene having a melt index of 2 and a density of 919 kg per cubic meter. A single screw extruder was used having a length to diameter ratio 48:1. The foam sample was 10.15 centimeters in diameter.

Table 7 shows burn tests comparing extruded foams prepared with a 100 percent ethane blowing agent to foams prepared with 100 percent butane blowing agent. The burned area for the foams produced with butane was nearly twice that of foams produced with ethane. The foams produced with butane produced a blue flame indicative of butane when burned and were completely consumed. The foams produced with ethane produced a flame when burned that indicated the polyethylene was burning. This flame was extinguished because insufficient oxygen was provided to sustain burning of polyethylene.

TABLE 7

Burn Test For Fresh Foam

| BLOWING AGENT | FOAM THICKNESS, cm | BURNED AREA, cm² |
| --- | --- | --- |
| Butane (66/40, 1SO/N) | 0.25 | 81 |
| Butane (60/40, 1SO/N) | 0.32 | 81 |
| Ethane | 0.15 | 41 |
| Ethane | 0.14 | 47.9 |

The resin from which the foam of Table 6 was made was a low density polyethylene having a melt index of 2 and a density of 919 kg per cubic meter. A counter-rotating twin screw extruder was used having a screw diameter of 68 mm. The foam samples were 10.15 centimeters in diameter (81 cm² in area).

The invention claimed herein has been described hereinabove with respect to particular preferred embodiments. These embodiments should be considered illustrative of and not in limitation of the invention claimed herein. The full scope of the invention should be judged in accordance with the appended claims and equivalents thereto.

What is claimed is:

1. An extrudable, expandable composition for producing stable, low density polyolefin foam products, said composition comprising:

a) a plasticized polyolefin resin; and b) a blowing agent for expanding the composition selected from the group consisting of ethane and a blend of carbon dioxide and a hydrocarbon selected from the group consisting of n-butane, isobutane, propane, ethane, and mixtures thereof, said hydrocarbon being present in the resin in an amount sufficient to produce a stable foam with a density of from about 20 kg/m³ to 120 kg/m³.

2. The expandable composition of claim 1 wherein said composition produces a fresh foam in which the blowing agent does not pick up flame when the fresh foam is exposed to flame.

3. The expandable composition of claim 1 wherein said polyolefin resin includes an aging modifier present in an amount sufficient to control shrinkage of the foam and a nucleation agent present in an amount sufficient to promote a uniform pore structure.

4. The expandable composition of claim 1 wherein said polyolefin resin includes an aging modifier present in an amount of from about 0.5 to 5 kg per 100 kg of resin, a nucleation agent present in an amount of from about 0.05 to 0.5 kg per 100 kg of resin, and wherein said blowing agent is present in an amount of from about 1 to 20 kg per 100 kg of resin.

5. The expandable composition of claim 1 wherein said polyolefin resin is a polyethylene resin and includes glycerol monostearate and a low activity nucleation agent.

6. The expandable composition of claim 1 wherein said blowing agent comprises carbon dioxide and a hydrocarbon selected from among the group consisting of n-butane, isobutane, propane, ethane, and mixtures thereof, and wherein said carbon dioxide and said hydrocarbon are present in said blowing agent in a ratio by weight of from about 1:20 to 20:1.

7. The expandable composition of claim 6 wherein said carbon dioxide and said hydrocarbon are present in a ratio by weight of from about 1:4 to 4:1.

8. The expandable composition of claim 6 wherein said carbon dioxide and said hydrocarbon are present in a ratio by weight of from about 1:3 to 3:1.

9. The expandable composition of claim 6 wherein said carbon dioxide and said hydrocarbon are present in about equal amounts by weight.

10. An expandable composition for producing polyethylene foam products, said composition comprising:

a) a plasticized polyethylene resin;

b) an aging modifier in an amount of from about 0.5 to 5 kg per 100 kg of resin;

c) a low activity metal oxide nucleation agent in an amount of from about 0.05 to 0.5 kg per 100 kg of resin; and d) a blowing agent in an amount of from about 1 kg to 20 kg per 100 kg of resin for expanding the composition, wherein said blowing agent is selected from the group consisting of ethane and blowing agents comprising from about 5% to 95% by weight of carbon dioxide and from about 95% to 5% by weight of a hydrocarbon selected from the group consisting of n-butane, isobutane, propane, ethane, and mixtures thereof, and wherein said hydrocarbon is present in an amount sufficient to reduce the viscosity of the resin and to produce a stable foam with a decreased density and desirable surface texture over that of carbon dioxide alone, without substantially increasing the flammability of the blowing agent.

11. The expandable composition of claim 10 wherein said aging modifier is glycerol monostearate and said nucleation agent is selected from the group consisting of zinc oxide, zirconium oxide, Baylith W, and talc.

12. The expandable composition of claim 11 wherein said glycerol monostearate is present in an amount of about 1.0 kg per 100 kg of resin and said nucleation agent is present in an amount of about 0.1 kg per 100 kg resin.

13. The expandable composition of claim 10 wherein said blowing agent is present in an amount of about 10 kg per 100 kg of resin.

14. The expandable composition of claim 10 wherein said blowing agent comprises a blend in about equal amounts by weight of carbon dioxide and a hydrocarbon selected from the group consisting of n-butane, isobutane, propane, ethane, and mixtures thereof.

15. An expandable composition for producing polyethylene foam products, said composition comprising:
   a) a plasticized low density polyethylene resin;
   b) glycerol monostearate in an amount of about 1.0 kg per 100 kg of resin;
   c) a nucleation agent in an amount of about 0.1 kg per 100 kg of resin; and
   d) a blowing agent in an amount of about 10 kg per 100 kg of resin, said blowing agent comprising by weight about 50% carbon dioxide and about 50% of a hydrocarbon selected from the group consisting of n-butane, isobutane, propane, ethane, and mixtures thereof.

16. A process for producing an extruded, low density, stable polyolefin foam product, said process comprising the steps of:
   a) mixing a blowing agent with a plasticized polyolefin resin, wherein the blowing agent is selected from the group consisting of ethane and a blowing agent comprising carbon dioxide and a hydrocarbon selected from the group consisting of n-butane, isobutane, propane, ethane, and mixtures thereof; and
   b) extruding the mixture of resin and blowing agent so as to produce a low density, foamed, stable polyolefin product having a density of 20 kg/m$^3$ to 120 kg/m$^3$.

17. The process of claim 16 wherein the resin and blowing agent mixture is extruded so as to produce fresh foam in which the blowing agent does not pick up flame when the fresh foam is exposed to flame.

18. The process of claim 16 wherein the blowing agent and plasticized polyolefin resin are mixed in the melting zone of an extruder at a temperature above the melting point of the resin that is sufficient to provide fluidity for mixing.

19. The process of claim 18 wherein the temperature of the resin in the melting zone is from about 20° C. above the melting point of the resin to about 100° C. above the melting point of the resin.

20. The process of claim 16 wherein the step of extruding the mixture of resin and blowing agent comprises extruding the mixture through a die orifice into a zone of reduced pressure to expand the resin, and controlling the temperature of the polyolefin resin so that the polymer maintains its structure upon expansion and expansion is not substantially hindered.

21. A process for producing an expanded polyethylene foam product, said process comprising the steps of:
   a) mixing a blowing agent comprising from about 20% to 80% by weight of carbon dioxide and from about 80% to 20% by weight of a hydrocarbon selected from the group consisting of n-butane, isobutane, propane, ethane, and mixtures thereof with a plasticized polyethylene resin, an aging modifier, and a nucleation agent in the melting zone of an extruder;
   b) extruding the mixture of blowing agent and resin through the orifice of the extruder; and
   c) expanding the mixture so as to produce a dimensional stable foam product.

22. The process of claim 21 wherein the resin in the melting zone of the extruder is at a temperature of from about 20° C. above the melting point of the resin to 100° C. above the melting point of the resin.

23. The process of claim 21 wherein said step of extruding the mixture is continuous.

24. The process of claim 21 wherein said blowing agent is present in said mixture in an amount of from about 1 kg to 20 kg per 100 kg of resin.

25. The process of claim 21 wherein said blowing agent is present in said mixture at an amount of about 10 kg per 100 kg of resin.

26. The process of claim 21 wherein said aging modifier is glycerol monostearate and is present in an amount sufficient to produce a stable foam having a density after seven days from expansion of greater than or equal to about 20 kg/m$_3$.

27. The process of claim 21 wherein said aging modifier is glycerol monostearate and is present in an amount of from about 0.5 kg to 5 kg per 100 kg of resin.

28. The process of claim 27 wherein said glycerol monostearate is present in an amount of about 1 kg per 100 kg of resin.

29. The process of claim 21 wherein said nucleation agent is zinc oxide and is present in an amount sufficient to promote a foam having a uniform pore structure.

30. The process of claim 21 wherein said nucleation agent is selected from the group consisting of zinc oxide and talc and is present in an amount of from about 0.05 to about 0.5 kg per 100 kg of resin.

31. The process of claim 30 wherein said nucleation agent is present in an amount of about 0.1 kg per 100 kg of resin.

32. The process of claim 21 wherein said mixing step takes place in from about one to three minutes.

33. A process for producing an expanded polyethylene foam product, said process comprising the steps of:
   a) mixing over a period of time of about 1 to three minutes in the melting zone of an extruder a blowing agent comprising from about 20% to 80% by weight of carbon dioxide and from about 80% to 20% by weight of a hydrocarbon selected from the group consisting of n-butane, isobutane, propane, ethane, and mixtures thereof with a plasticized low density polyethylene resin composition at a melt temperature of from about 20° C. above the normal melting point of the resin to 100° C. above the normal melting point of the resin and in the amount of about 1 kg to 20 kg of blowing agent per 100 kg of resin, the polyethylene resin composition comprising polyethylene, glycerol monostearate in an amount of from about 0.5 kg to 5 kg per 100 kg of resin, and a nucleation agent in an amount of from about 0.05 to 0.5 kg per 100 kg of resin;
   b) extruding the mixture of blowing agent and resin composition at a temperature in the range of from about 85° C. to 100° C. through the die of an extruder; and
   c) expanding the mixture to produce a dimensional stable foam product having a density after seven days greater than or equal to about 20 kg/m$^3$.

* * * * *

UNITED STATES PATENT AND TRADEMARK OFFICE
CERTIFICATE OF CORRECTION

PATENT NO. : 5,462,974  Page 1 of 2
DATED : October 31, 1995
INVENTOR(S) : Lee

It is certified that error appears in the above-identified patent and that said Letters Patent is hereby corrected as shown below:

Column 11, after line 34 and in Table 4 "TEST RSULTS" should be -- TEST RESULTS --.

Column 11, Table 4 in the heading, "Foam" should be inserted over "Density" and deleted over "Cell".

Column 15, line 48, "20°C." should be -- 20°C --.

Column 15, line 49, "100°C." should be -- 100°C --.

Column 16 line 8, "20°C." should be -- 20°C --.

Column 16 line 8, "100°C." should be -- 100°C --.

Column 16, line 50, "20°C." should be -- 20°C --.

Column 16 line 51, "100°C." should be -- 100°C --.

Column 16 line 60, "85°C." should be -- 85°C --.

UNITED STATES PATENT AND TRADEMARK OFFICE
CERTIFICATE OF CORRECTION

PATENT NO. : 5,462,974
DATED : October 31, 1995
INVENTOR(S) : Lee

It is certified that error appears in the above-indentified patent and that said Letters Patent is hereby corrected as shown below:

Column 16, line 60, "100°C." should be —100°C—.

Signed and Sealed this

Twenty-seventh Day of February, 1996

*Attest:*

BRUCE LEHMAN

*Attesting Officer*     *Commissioner of Patents and Trademarks*